April 20, 1965  G. B. KUEHNE ETAL  3,179,213
DIELECTRIC WINDOW AND METHOD OF MAKING IT
Filed March 14, 1960  2 Sheets-Sheet 1

INVENTORS
GERHARD B. KUEHNE
WERNER P. SCHULZ
BY
Leon F. Herbert
Robert W. Dilts
ATTORNEYS

3,179,213
DIELECTRIC WINDOW AND METHOD OF MAKING IT
Gerhard B. Kuehne, San Mateo, and Werner P. Schulz, San Bruno, Calif., assignors to Eitel-McCullough, Inc., San Carlos, Calif., a corporation of California
Filed Mar. 14, 1960, Ser. No. 14,796
18 Claims. (Cl. 189—36.5)

This invention relates to a dielectric window, conveniently flat, having a metal ring bonded adjacent its edges and particularly to a dielectric window in which the dielectric is quartz, and to the method of making it. As used herein throughout the description and claims, the term "quartz" means quartz in the vitreous, or non-crystalline state, often referred to as pure silica glass or fused quartz.

Quartz is a very low-loss dielectric with a low dielectric constant and is therefore a very desirable substance for windows in high frequency electronic components such as waveguides, resonant cavities, tubes such as klystrons, charged-particle accelerators, etc. Quartz has a very high transparency for infrared and ultra-violet radiation, which makes it an excellent window for photo cells, lamps, and similar devices in this frequency range. Some other outstanding properties of quartz are its extremely low thermal expansion coefficient which results in great thermal shock stability, its ability to withstand electron bombardment and exposure to X-rays and other atomic radiation without receiving any appreciable radiation damage, and its ability to withstand exposure to very high electric field strengths before breakdown occurs.

In the past, only limited use has been made of quartz, for the purposes described, even though its desirable characteristics have been well known. The reason for its limited use is that heretofore there has been no practical means for making a strong vacuum-tight bond between quartz—especially, a flat quartz window—and the metal rim surrounding the window which oftentimes forms a part of electron tubes and other devices in which the window is useful.

In recent years, great strides have been taken in the art of making a seal (vacuum-tight bond) between ceramic and metal, and ceramic is now used extensively as a replacement for glass in electron tubes. The problem of making a quartz-to-metal seal is much more severe than the problem of making a ceramic-to-metal seal. The first difficulty results from the fact that quartz has a much lower coefficient of thermal expansion than any metal.

In co-pending application, No. 793,993, filed February 18, 1959, now Patent Number 3,115,957, granted December 31, 1963, and assigned to the same assignee as this application, a quartz metalizing process and a quartz-to-metal seal are disclosed. The quartz is metalized by applying metallic particles of sufficiently small size in a sufficiently high degree of compactness so that the particles can be sintered to the quartz at substantially lower temperatures than are required in connection with the particle size and compactness associated with the metalizing methods as used in connection with ceramic metalizing. The small metallic particles are vapor plated onto the quartz and are then metallized to the quartz by applying heat. This film of metallic particles has a thickness of approximately 5,000 angstroms. Then, for the reason described in the above-mentioned application, a very ductile metal that does not alloy with the thin film metalized on the quartz is preferably pressure-sealed by a suitable process to the metalized thin film on the quartz, forming the quartz-to-metal seal. The ductile metal is preferably pure gold, pure silver, or pure copper because any impurity in the pure metals will impair their ductility. Therefore pressure is used instead of brazing to seal the quartz to a metal, because brazing results in alloying of the metals in the seal and the alloys are less ductile than the pure metals.

In cases where the metalized area is planar, as the ends of quartz tubes, the method for pressure-sealing the ductile metal on the layer and the resultant structure is simple. But in cases where the metalized area is not planar, as the cylindrical peripheral surface of a flat quartz window, and as used—for example, to form a vacuum wall disposed transversely in a metallic waveguide—a pressure seal between the wall of a tubular ductile metal and a metalized peripheral surface around the flat quartz window is difficult to obtain because pressure has to be applied and directed normal to, and evenly around, the metalized surface. Since other dielectric materials, such as ceramics, do not have the severe difference of thermal expansion with metals as quartz has with metal, the metals in the ceramic-to-metal seals do not require so much ductility as metals in the quartz-to-metal seals. Then a simple brazing operation will seat the peripheral surface of a flat ceramic member to the walls of a waveguide.

In most applications where a quartz-to-metal seal is required, a quartz-to-metal seal with a quartz backing member produces a more desirable seal than a simple quartz-to-metal seal, the same as a ceramic-to-metal seal with a ceramic backing member produces a more desirable seal than a simple ceramic-to-metal seal. The seal with a backing member is termed a "sandwich seal" because the metal is disposed between two dielectric pieces. A sandwich seal tends to counterbalance the thermal shearing stresses in the seal, making a strong seal. But a sandwich seal in which the seal is in tubular form is very difficult to make because a dielectric backing ring has to be compressed around the metal tube. Since dielectrics, and especially quartz, are very hard and brittle materials, compressive hoop stresses cannot be applied to a dielectric ring without cracking the ring.

It is an object of this invention to make a quartz window with a metal ring bonded around a peripheral edge portion of the window to form a vacuum-tight seal.

It is another object of this invention to provide a dielectric window with a "sandwich seal" around a peripheral edge portion of the window.

It is still another object of this invention to provide a method of forming a dielectric-to-metal seal around a dielectric window, especially when the dielectric is quartz.

The invention possesses other objects and features of advantage, some of which, with the foregoing, will be set forth in the following description of the invention. The invention is not limited to the disclosed embodiment of method and means, as variant embodiments thereof are contemplated and may be adopted within the scope of the claims.

Referring to the drawings.

Figure 1:
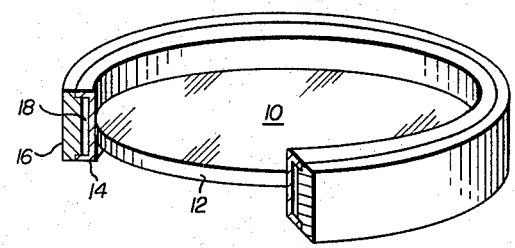
FIGURE 1 is a perspective of a novel structure of quartz window having a tubular metal ring sealed around its edge forming a bonded surface which is non-planar. A portion of the structure is broken away to reveal the cooperative relationship of the parts.

Referring to the drawings in greater detail and to FIGURE 1 in particular, there is shown a flat circular quartz window 10 which has a cylindrical metalized surface 12, which is normal to the plane of the window 10. A tubular gold ring 14 having a channel cross-section is pressure-welded (pressure sealed) to the cylindrical metalized surface 12, and across the open section of the channel a tubular copper ring or sleeve 16 is brazed to the gold ring 14, forming an annular void 18 between the gold and copper.

The quartz disc was metalized by the process as taught in the above-mentioned pending application 793,993 filed February 18, 1959, now Patent Number 3,115,957, granted December 31, 1963, and the quartz-to-metal seal is then made as follows: The quartz window 10 fits snugly within the gold ring 14. The void 18 formed by the gold ring 14 and the copper ring 16 is filled with a liqud such as water and sealed. The assembled quartz and metal ring is heated to develop in void 18 a pressure which is directed normal to the metalized surface 12. As taught in the above-mentioned application, silver or copper, being also very ductile metals, may be substituted for gold. This structure and procedure form a satisfactory and a very economical quartz window having a metalized frame sealed thereto. Other dielectric materials such as ceramics, including alumina and beryllia, may be substituted for quartz.

A circular window is shown in the drawing and the above structure is satisfactory in low-power application, but one can see that square and rectangular windows will present specific problems in obtaining an effective pressure seal around the windows. In high-power and heavy-load application the above structure has limited application. If this window, especially if non-circular, is subjected to excessive thermal cycling or excessive transmission of electromagnetic energy, the pressure seal between the ring 14 and the metalized surface 12 on the dielectric tends to weaken and develop a leak.

Figure 2:
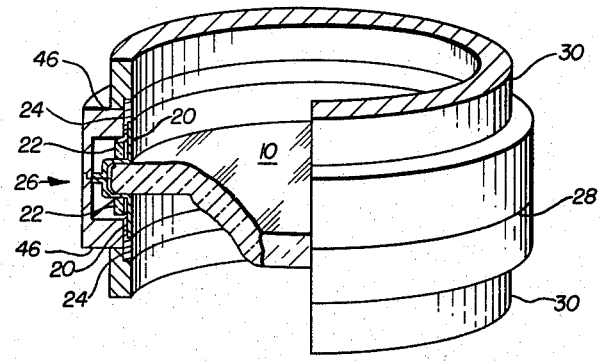
FIGURE 2 is a perspective of another novel structure of a quartz window having a tubular metal ring sealed adjacent a peripheral edge portion of the transverse surface of a flat window and incorporating the sandwich seal. A portion of the structure is broken away to show the interior construction thereof.

In FIGURE 2 there is shown an improved structure for a dielectric window, preferably quartz, having a metallic frame sealed to its outer edge. In this structure the quartz window 10 is metalized in a portion adjacent the outer edge of both its flat surfaces. A circular window 10 is shown but the window may be any polygon shape. Two tubular gold rings 20 which have a modified Z or spraddled M cross-section are pressure-sealed onto the metalized surface of the quartz window 10 with a quartz backing member 22, which also has a metalized surface, pressure-sealed to the gold. The metal frame is structurally reinforced by a copper tube 24 bonded to an end of each tubular gold ring portion 20. A tubular channel-cross-section copper ring or sleeve 26 is brazed to the copper tubes 24, thus enclosing the gold rings 20. The tubular copper ring 26 comprises two similar sections brazed together at seam 28 for facily of fabrication and so that the ring 26 may enclose the gold rings 20. A suitable waveguide portion 30 is then brazed to the channel-shape copper ring or sleeve 26 as desired.

The metalized surfaces on the quartz window 10 and backing members 22 can be formed from any suitable metal as taught in the above-mentioned co-pending application. The gold rings 20 may be substituted by other metals of high ductility, such as silver or copper, as also taught in the above-mentioned co-pending application. Other dielectric materials such as ceramics, including alumina and beryllia, may be substituted for quartz because a "sandwich seal" is also more desirable with these materials.

Figure 4:
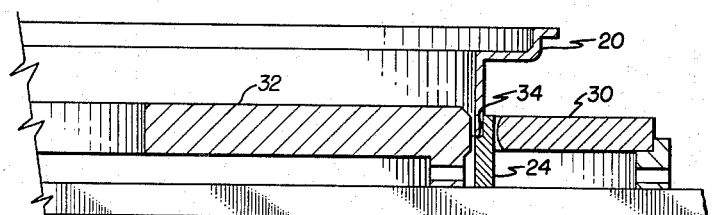
FIGURE 4 is a cross-section of an apparatus for welding a gold ring to a copper ring.

The tubular metal frame assembly as shown in FIGURE 2 is assembled on the quartz disc in the following manner: One of the copper tubes 24 is first bonded to one of the gold rings 20 by the means and process as shown in FIGURE 4. An outer ring 30 which has a slightly larger inner diameter than the outer diameter of the copper ring is placed outside the copper ring 24. A metal disc 32 which has an outer diameter slightly smaller than the inner diameter of both the gold ring 20 and copper ring 24 is placed within the copper ring. The gold ring 20 fits into an annular step 34 formed on the inner surface of the copper ring 24.

The assembly as shown in FIGURE 4 is placed on the base 36 of a suitable oven and is heated. The metal disc 32 is made either of stainless steel or copper and the outer ring 30 is made of molybdenum; thereby they will expand at different rates causing the gold ring 20 to be pressed against the copper tube 24 to form a pressure seal between the two. A suitable protection such as a layer of graphite is placed between the inner ring 32 and the gold, and the outer ring 30 and the copper so that a pressure weld is not formed therebetween.

Figure 3:
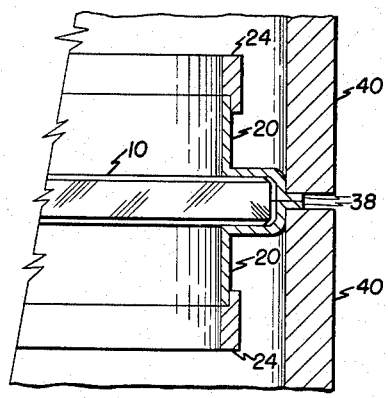
FIGURE 3 is a cross-section of an apparatus for welding two gold rings together around quartz window.

Two of the gold 20 and copper 24 assemblies are placed around the quartz window 10 as shown in FIGURE 3. The lips 38 of the gold rings 20 touch as shown and are pressed together to form a pressure weld by applying pressure to the lips 38 through two heavy metal members 40 which are disposed on opposite sides of the lips 38.

Figure 5:
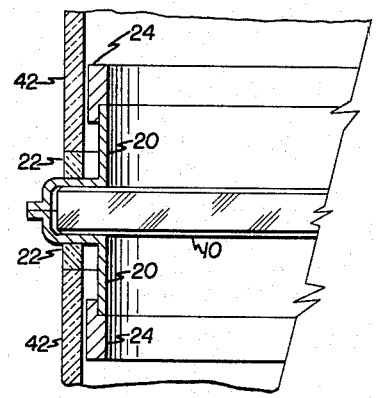
FIGURE 5 is a cross-section of an apparatus for pressure sealing gold rings to quartz.

The vacuum-tight pressure seal between the gold tube 20 and the metalized surface on the quartz 10 is formed in the following manner, and referring to FIGURE 5: There are shown two quartz backing members 22 adjacent each of the gold rings 20 and on the side thereof opposite the quartz window 10. The quartz backing members 22 have a metalized surface on the surface next to the gold tube, and the quartz window 10 also has its metalized surface next to the gold tube. Two elongated quartz tubes 42 having the same inner diameter and outer diameter as the quartz backing member 22 are placed one on each of the quartz members 22 as shown. These tubes 42 are made of the same dielectric material as the members 22 and window 10 because then excessive pressure cannot be transmitted to members 22 which pressure may crack the members 22. The vacuum-tight pressure seal is formed between the tubular gold rings and quartz members by applying pressure on each of the quartz tubes 42 toward each other. The gold-to-quartz seal between the gold ring 20 and quartz member 22 and the gold-to-quartz seal between the gold ring 20 and quartz disc 10 are formed simultaneously. The required pressure for making two gold-to-quartz pressure seals is also taught in the co-pending application mentioned above. The tubular channel-cross-section copper ring or sleeve 26 is then brazed to the copper tubes 24 so that each of the legs 46 of the channel (FIGURE 2) is bonded to one of the copper tubes 24. This provides a quartz window with a metallic frame bonded vacuum-tight thereto and the frame has structural strength. If other dielectric materials are substituted for the window 10, then the same material should preferably be used for the tubes 42 and members 22.

As mentioned above, the quartz discs 10 can have other than circular shapes, such as rectangular or square. If other shapes are used, then the shapes of the gold, copper, and quartz backing rings should suitably correspond. Also the quartz may be a ceramic such as alumina or beryllia, and the teaching of this application may be used to make a pressure-seal assembly incorporating a dielectric and metal. Of course, it should be understood that if a ceramic such as alumina or beryllia is substituted for quartz in the structure shown in FIGURE 2, the pressure seal may be replaced by a brazed seal since, as mentioned above, in some ceramic-to-metal seals less ductile metals can be used in the seal than can be used in quartz-to-metal seals.

We claim:

1. A window comprising a dielectric member, an annular metalized section on said dielectric member disposed on an outer peripheral portion thereof, a metal ring assembly sealed intermediate its ends to said metalized section to form a hermetic seal therebetween, said metal ring assembly comprising coaxially arranged inner and outer tubular portions paced apart to provide a chamber therebetween and having corresponding end portions hermetically united.

2. The window of claim 1 wherein said inner tubular portion is formed of a ductile material and the outer tubular portion is formed from a relatively less ductile material.

3. The combination according to claim 1, in which the metalized section of said dielectric member is pressure-sealed to the inner tubular portion.

4. A window comprising a dielectric member, an annular metalized section on said dielectric member disposed on an outer peripheral portion thereof, a tubular metal ring sealed intermediate its ends to said metalized section to form a vacuum-tight seal therebetween, said tubular metal ring having an enlarged diameter radially extending portion, the metalized outer peripheral portion of said dielectric member being disposed within said enlarged portion, said metalized section including a transverse surface adjacent the outer edge of said dielectric member.

5. A window comprising a dielectric member, a metalized area on said dielectric member disposed on the peripheral edge surface thereof, a metal ring hermetically sealed to said metalized surface area to form a vacuum-tight seal therebetween and having an annular chamber therewithin, and a fluid within said chamber adapted to expand upon being heated to impose a compressive stress on said dielectric member.

6. A window as claimed in claim 4 wherein a dielectric backing member having a metalized surface substantially normal to the axis of said backing member is sealed to said tubular metal ring on the side thereof opposite said seal between the tubular metal ring and said flat dielectric member.

7. A window comprising a dielectric member, a metalized surface area disposed adjacent the outer edge of said dielectric member, a tubular ring of highly ductile metal hermetically sealed to the metalized surface, a dielectric tubular backing member sealed to said ring on the side thereof opposite the seal between the ring and said metalized surface area, and a tubular sleeve coaxially surrounding the dielectric member, tubular ring and dielectric backing member, the ends of the tubular sleeve being bonded to corresponding ends of said tubular ring.

8. The window as claimed in claim 7 wherein said tubular ring of ductile metal comprises two complementary portions placed end-to-end with their edges bonded together.

9. A window as claimed in claim 8 wherein a stiffening ring of metal other than gold is bonded to each remote end of said tubular ring, and said tubular sleeve is bonded to said metal stiffening rings.

10. A window comprising a disk-shaped dielectric member, an annular metalized surface on each of the opposite faces of said dielectric member, a first relatively ductile metal ring segment having a flat flange portion bonded to said metalized surface on one of said faces and having a leg portion extending from said flange portion, a second relatively ductile metal ring segment having a flat flange portion bonded to said metalized surface on the other of said faces and having a leg portion extending from its flange portion, and a ring structure extending across the periphery of said disk-shaped dielectric member and joined to the leg portions of said ring segments, said ring structure being relatively non-ductile as compared to said relatively ductile ring segments.

11. A window as claimed in claim 10 in which said leg portions are cylinder-shaped and said junction between each leg portion and said ring structure is located at a position along the leg portion spaced a substantial distance from said flat flange portion.

12. A window as claimed in claim 10 in which a dielectric backing ring is sealed to each of said flat flange portions on the opposite side thereof from said disk-shaped dielectric member.

13. A window as claimed in claim 10 in which the flat flange portion of at least one of said ring segments has an annular extension thereon projecting outwardly beyond the periphery of said disk-shaped member and into abutment with said ring structure.

14. A window as claimed in claim 10 in which the flat flange portions of said first and second ring segments have extensions thereon projecting around the periphery of said disk-shaped dielectric member and joined together to make said first and second ring segments a unitary ring.

15. A window as claimed in claim 14 in which said first and second ring segments are individual pieces joined together by a seal between said extensions projecting around the periphery of the dielectric member.

16. A window comprising a disk-shaped quartz member, an annular metalized surface on each of the opposite faces of said quartz member, a first relatively ductile metal ring segment having a flat flange portion pressure sealed to said metalized surface on one of said faces and having a leg portion extending from said flange portion, a second relatively ductile metal ring segment having a flat flange portion pressure sealed to said metalized surface on the other of said faces and having a leg portion extending from its flange portion, and a metal ring structure extending across the periphery of said disk-shaped quartz member and joined to the leg portions of said ring segments, said ring structure being relatively non-ductile as compared to said relatively ductile ring segments.

17. A window as claimed in claim 16 in which said leg portions are cylinder-shaped, and a pressure seal joins the periphery of each said leg portion to said ring structure.

18. A window as claimed in claim 16 in which a quartz backing ring is pressure sealed to each of said flat flange portions on the opposite sides thereof from said disk-shaped quartz member, and the unsealed ends of said backing rings are out of contact with said ring structure.

References Cited by the Examiner
UNITED STATES PATENTS

| | | | |
|---|---|---|---|
| 2,654,043 | 9/53 | Freeman et al. | |
| 2,752,532 | 6/56 | Dussaussoy et al. | 220—2.3 |
| 2,767,467 | 10/56 | Siegel | 29—497.5 |
| 2,782,498 | 2/57 | Mushovic | 29—497.5 |
| 2,798,577 | 7/57 | La Forge | 189—36.5 |
| 2,857,663 | 10/58 | Beggs. | |
| 2,876,596 | 3/59 | Kessler | 49—81 |
| 2,915,153 | 12/59 | Hitchcock | 189—36.5 |

JACOB L. NACKENOFF, *Primary Examiner.*

EARL J. DRUMMOND, C. D. ANGEL, *Examiners.*